(12) United States Patent
Kaneko

(10) Patent No.: US 6,353,485 B1
(45) Date of Patent: Mar. 5, 2002

(54) IMAGE INPUT/OUTPUT APPARATUS IMAGE INPUT/OUTPUT PROCESSING METHOD AND CARTRIDGE

(75) Inventor: Kiyoshi Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/098,545

(22) Filed: Jun. 17, 1998

(30) Foreign Application Priority Data

Jun. 20, 1997 (JP) ............................................. 9-164751
Jun. 3, 1998 (JP) .......................................... 10-154658

(51) Int. Cl.⁷ ......................... H04N 1/21; B41B 15/00; G01D 15/16; G01D 15/02
(52) U.S. Cl. ......................... 358/1.2; 358/296; 358/297; 346/140.1; 346/141
(58) Field of Search ........................ 358/1.2, 296, 297, 358/474; 346/140.1, 140 R, 141

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | * 7/1984 | Ayata et al. ................... 347/56 |
| 4,558,333 A | 12/1985 | Sugitani et al. |
| 4,608,577 A | 8/1986 | Hori |
| 4,723,129 A | 2/1988 | Endo et al. |
| 4,740,796 A | 4/1988 | Endo et al. |
| 5,063,451 A | 11/1991 | Yanagisawa et al. |
| 5,767,988 A | * 6/1998 | Dobbs et al. ................ 358/474 |

FOREIGN PATENT DOCUMENTS

| EP | 0 471 369 | 2/1992 | | |
| EP | 0 641 115 | 3/1995 | | |
| JP | 54-056847 | 5/1979 | | |
| JP | 59-123670 | 7/1984 | | |
| JP | 59-138461 | 8/1984 | | |
| JP | 60-071260 | 4/1985 | | |
| JP | 1-221251 | 9/1989 | | |
| JP | 2-134064 | * 5/1990 | .......... H04N/1/024 |
| JP | 2-134065 | 5/1990 | | |
| JP | 8-183173 | * 5/1990 | .............. B41J/2/01 |
| JP | 7-107245 | 4/1995 | | |
| JP | 7-314860 | 12/1995 | | |
| JP | 8-183173 | 7/1996 | | |

* cited by examiner

*Primary Examiner*—Edward Coles
*Assistant Examiner*—Twlyer Lams
(74) *Attorney, Agent, or Firm*—Fitzpatrick, Cella, Harper & Scinto

(57) ABSTRACT

An image input/output apparatus is capable of image printing and reading with simple controls, and a cartridge reads an original with a simple control. When a removable printhead or image reading head is attached to a common carriage to print an image on a print medium or read an original, a flip-flop in an image processing IC inputs a printing period signal, and generates a reading period signal to control a reading operation in synchronization with an internal clock of a scanner unit. A line sensor is controlled based on the generated reading period control signal.

44 Claims, 10 Drawing Sheets

IMAGE INPUT/OUTPUT APPARATUS IMAGE INPUT/OUTPUT PROCESSING METHOD AND CARTRIDGE

BACKGROUND OF THE INVENTION

This invention relates to an image input/output apparatus, image input/output processing method and cartridge and, more particularly to an image input/output apparatus and an image input/output processing method for reading an original image and for printing an image on a print sheet and to a cartridge used for reading the original image.

Conventionally, a printer having a printhead for printing according to an ink-jet method or thermal transfer method, attached to a carriage, is used as an output device for a personal computer, a word processor and the like. The printer prints an image on a print sheet by scanning the carriage.

Further, a printer is known that can operate as a scanner. The printer reads an original image by using an image reading unit such as a COD having a photoelectric conversion function. The image reading unit is mounted on the carriage in place of the printhead. The printer inputs the read image data into a personal computer, a word processor or the like.

However, in the above conventional printer, the image printing width and the printing resolution of the printhead are somewhat different from the image reading width and the reading resolution of the image reading unit. In this case, as the printing period of the image printing operation is different from the image reading period of the image reading operation, the moving speed of the carriage to move the printhead and that to move the image reading unit are different. This complicates controls of carriage motors, and increases the memory capacity for storing information necessary for these controls, thus increasing the production cost of the apparatus.

SUMMARY OF THE INVENTION

Accordingly, it is an object of the present invention to provide an image input/output apparatus and image input/output processing method which enable image printing and image reading with simple control.

It is another object of the present invention to provide a cartridge used for reading an original with easy control.

According to one aspect of the present invention, the foregoing object is attained by providing an image input/output apparatus capable of performing an image output or original image reading by attaching to a carriage either an exchangeable printhead for printing an image on a print medium or exchangeable image reading head for reading an original image. The apparatus includes a scanning unit which scans the carriage; print period generation means for generating a print period control signal corresponding to a period of driving the printhead; and reading period generation means for generating a reading period control signal corresponding to a period of a reading operation by the image reading head, based on the printing period control signal. When reading the original image by attaching the image reading head to the carriage, the reading operation is performed based on the reading period control signal generated by the reading period generation means.

It is preferable that the printhead includes a plurality of print elements, the image reading head includes a plurality of reading elements, and a printing width corresponding to the plurality of print elements of the printhead and a reading width corresponding to the plurality of reading elements of the image reading head are the same.

In this case, it is more preferable that:
a printing resolution by the plurality of print elements of the printhead and a reading resolution by the plurality of reading elements of the image reading head are the same,
a spatial interval of the plurality of print elements of the printhead and a spatial interval of the plurality of reading elements of the image reading head are the same, or
the number of the plurality of printing elements of the printhead and the number of the plurality of reading elements of the image reading head are the same.

It is also preferable that a period of the printing period control signal and that of the reading period control signal are the same.

It is also preferable that the reading period generation means generates the reading period control signal as a signal obtained by multiplying a period of the printing period control signal by an integer. By doing this, it is possible that a reading resolution of the image reading head in the reading operation is reduced to a printing resolution of the printhead part of an integer, using the reading period control signal generated by the reading period generation means.

Further, as another preferred embodiment, if the reading period control signal is a clock pulse signal having a predetermined frequency, it is possible that the reading period generation means generates another clock pulse signal whose frequency is the predetermined frequency part of an integer, and a reading resolution of the image reading head in the reading operation is reduced to a printing resolution of the printhead part of the integer, using the reading period control signal generated by the reading period generation means.

Furthermore, as still another preferred embodiment, it is preferable that the reading period generation means generates the reading period control signal as a signal having a period obtained by dividing a period of the printing period control signal by an integer. By doing this, it is possible that a reading resolution of the image reading head in the reading operation is increased to the integral multiple of a printing resolution of said printhead, by using the reading period control signal generated by the read period generation means.

On the other hand, if the printing period control signal is a clock pulse signal having a predetermined frequency, it is possible that the reading period generation means generates another clock pulse signal whose frequency is an integral multiple of the predetermined frequency, and a reading resolution of the image reading head in the reading operation is increased to the integral multiple of a printing resolution of the printhead, by using the reading period control signal generated by the reading period generation means.

It is preferable that the image reading head includes: a light-emitting device, such as an LED, emitting light on the original; and a photo-reception device, such as a photoelectric transducer which generates an electric signal in accordance with received light intensity, receiving the light which has been emitted by the light-emitting device and reflected by the original.

As described above, in a case where the printhead includes a plurality of print elements, and the image reading head includes a plurality of reading elements, it may be arranged that a printing resolution by the plurality of print elements of the printhead and a reading resolution by the plurality of reading elements of the image reading head are different from each other, and the printing resolution is neither an integral multiple of the reading resolution nor the reading resolution part of an integer.

In this case, it is more preferable that:

a spatial interval of the plurality of print elements of the printhead and a spatial interval of the plurality of reading elements of the image reading head are different from each other, or a period of the printing period control signal is neither an integral multiple of a period of the reading period control signal nor a value obtained by dividing the period of the reading period control signal by an integer.

By doing this, if the printing period control signal is a clock pulse signal having a predetermined frequency, and it is possible that the reading period generation means generates another clock pulse signal whose frequency is neither the integral multiple of the predetermined frequency nor the predetermined frequency part of the integer.

Furthermore, it is preferable that the apparatus further comprises regulation means for synchronizing a signal pulse of the reading period control signal generated by the reading period generation means with a signal pulse of the printing period control signal at predetermined intervals. In this case, it is preferable that the predetermined interval is determined based on the period of the reading period control signal generated by the reading period generation means and the period of the printing period control signal.

It is desirable that the above apparatus further includes a feeding unit which feeds the print medium or the original.

It should be noted that the above-described printhead is an ink-jet printhead that performs printing by discharging ink, and the ink-jet printhead preferably has electrothermal transducers to generate thermal energy to be supplied to ink so as to discharge the ink by utilizing the thermal energy.

According to another aspect of the present invention, the foregoing object is attained by providing an image input/output processing method operative in an image input/output apparatus capable of performing an image output or original image reading by attaching to a carriage either an exchangeable printhead for printing an image on a print medium or an exchangeable image reading head for reading an original image and scanning the carriage. The method includes a print period generation step of generating a print period control signal corresponding to a period of driving the printhead; and a reading period generation step of generating a reading period control signal corresponding to a period of a reading operation by the image reading head, based on the printing period control signal, wherein when reading the original image with the image reading head being attached to the carriage, the reading operation is performed based on the reading period control signal generated in the reading period generation step.

It is preferable that a period of the generated reading period control signal is the same as that of the printing period control signal, an integral multiple of that of the printing period control signal or a value obtained by dividing that of the printing period control signal by an integer.

Alternatively, if the method further includes a regulation step of synchronizing a signal pulse of the reading period control signal with a signal pulse of the printing period control signal at predetermined intervals, it is preferable that a period of the generated reading period control signal is not the same as that of the printing period control signal, an integral multiple of that of the printing period control signal or a value obtained by dividing that of the printing period control signal by an integer.

According to still another aspect of the present invention, the foregoing object is attained by providing a cartridge usable in an image input/output apparatus that performs image printing and image reading by attaching one of a plurality of exchangeable cartridge to a carriage and scanning the carriage. The cartridge includes a plurality of elements arranged in a predetermined resolution; and generation means for generating a driving period control signal indicating a period of driving the plurality of elements, based on a signal, indicating a predetermined period, generated by the apparatus.

Note that the plurality of elements are preferably reading elements for reading an original. If the cartridge further comprises a light-emitting device, S such as an LED, emitting light on the original, the plurality of elements can be photo-reception devices, such as photoelectric transducers that generate an electric signal in accordance with received light intensity, receiving the light emitted from the light-emitting device and reflected by the original.

It is preferable that the signal indicating the predetermined period is applicable to another cartridge attachable to the carriage.

It is also noted that:

the signal indicating the predetermined period is capable of being supplied via the carriage;

in a case where the plurality of elements are reading elements for reading an original, the cartridge functions as a reading cartridge for reading the original;

in a case where the plurality of elements are printing elements for printing on a print medium, the cartridge functions as a printhead, and the signal indicating the predetermined period is used for driving the printhead.

It is preferable that a period of the driving period control signal generated by the generation means is the same as the predetermined period, an integral multiple of the predetermined period or the predetermined period part of an integer.

On the other hand, if the cartridge further comprises regulation means for synchronizing the signal indicating the predetermined period with the driving period control signal at predetermined intervals, it is also preferable that a period of the driving period control signal is not the same as the predetermined period, an integral multiple of the predetermined period or the predetermined period part of an integer.

In accordance with the present invention as described above, upon performing an image output or original image reading by attaching to a carriage either an exchangeable printhead for printing an image on a print medium or exchangeable image reading head for reading an original image and scanning the carriage, a print period control signal corresponding to a period of driving the printhead is generated, while a reading period control signal corresponding to a period of a reading operation by the image reading head is generated based on the printing period control signal, and the reading operation is performed based on the generated reading period control signal when reading an original image with the image reading head being attached to the carriage.

The present invention is particularly advantageous since it make separate control circuits respectively for the printing operation and the reading operation unnecessary by providing a common control circuit. This simplifies the apparatus construction, and reduces the cost of the apparatus.

Also, it is advantageous since an operation of reading an original is performed with simple control.

Further, for example, the reading period control signal is generated by multiplying the period of the printing period control signal by an integer, and the reading resolution of the image reading head is reduced to the printing resolution part of an integer by using the generated reading period control signal. Thus, since the photo-reception amount at the photoelectric transducer of the image reading head can be an integral multiple of that when the reading resolution and the printing resolution are the same, in reading a multivalued image, a sufficient light amount for discriminating the tone level can be obtained.

Furthermore, even though there is a case where the reading period control signal corresponding to the reading resolution is neither an integral multiple of the printing period control signal corresponding to the printing resolution nor that part of an integer, for example, the printing resolution is 360 dpi (dots/inch) while the reading resolution is 300 dpi, an appropriate reading period control signal can be generated based on the printing period control signal by adding a simple circuit. Thus, a resolution required by an application software program for image processing or character recognition can be easily obtained.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will now be described in detail in accordance with the accompanying drawings.

Figure 1:
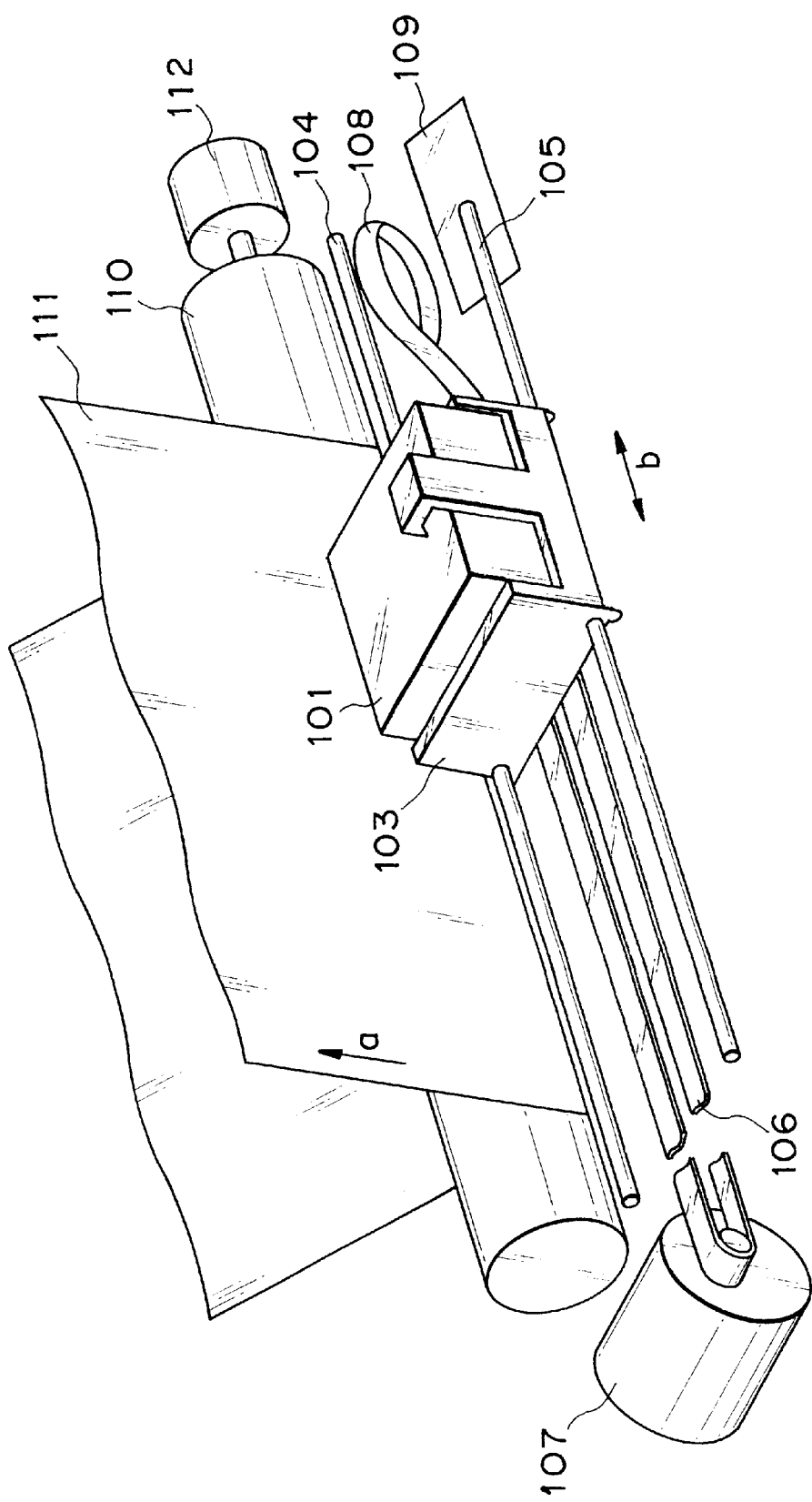
FIG. 1 is a perspective view showing the schematic structure of an image printing/reading apparatus as a typical embodiment of the present invention.

FIG. 1 is a perspective view showing the schematic structure of an image printing/reading apparatus as a typical embodiment of the present invention. The apparatus operates as a printing apparatus to perform printing by discharging ink on a print medium such as a print sheet when a printhead for printing in accordance with an ink-jet method is mounted on a carriage. On the other hand, the apparatus operates as a reading apparatus to read an original image printed on a print medium such as a print sheet when an optical image reading unit (which is called as a "reading cartridge") is mounted on the carriage. Accordingly, the printhead and the image reading unit to be described below are removable with respect to the carriage, and exchanged in accordance with necessity.

Note that in FIG. 1, a printhead 101 is mounted on a carriage 103. The printhead 101 has 128 ink discharge orifices arrayed in a paper-feed direction (the arrow a direction) of a print sheet 111.

In FIG. 1, reference numeral 112 denotes a paper-feed motor for feeding the print sheet 111; 104 and 105, guide shafts for holding the carriage 103 movably in the arrow b direction; 106, a belt; 107, a carriage motor which generates a driving force to scan the carriage 103 along the guide shafts 104 and 105 in the arrow b direction; 108, a flexible printer cable (FPC); 109, a print board on which a controller is packaged; and 110, a paper-feed roller.

Further, the printhead 101 and the print board 109 are electrically connected with the flexible printer cable (FPC) 108. The paper-feed roller 110, rotated by the paper-feed motor 112, feeds the print sheet 111 in the arrow a direction.

In the apparatus having the above construction, the image printing operation will be made as follows.

When the carriage 103 carrying the printhead 101 with 128 ink discharge orifices moves from the left to the right (as a forward scan) in FIG. 1, dots are printed in up to 128 lines on the print sheet 111. In other words, an image for a print width corresponding to 128 ink discharge orifices is printed. Then, the paper-feed roller 110 rotates to feed the print sheet 111 by a printing width (corresponding to 128 lines). At this time, the carriage 103 moves from the right to the left (as a reverse scan) in FIG. 1, in preparation for the next image printing by the carriage scanning.

Thus, image printing to print an image on the print sheet 111 is performed by repeating the movements of the carriage 103 and the paper feeding as above plural times.

Note that in the above description, the printing operation is made by printing dots while the carriage 103 makes the forward scan, however, it may be arranged such that dots are printed in both the forward scan and the reverse scan of the carriage 103.

As described above, an image reading operation is performed by mounting an image reading unit 102 on the carriage 103.

Figure 2:
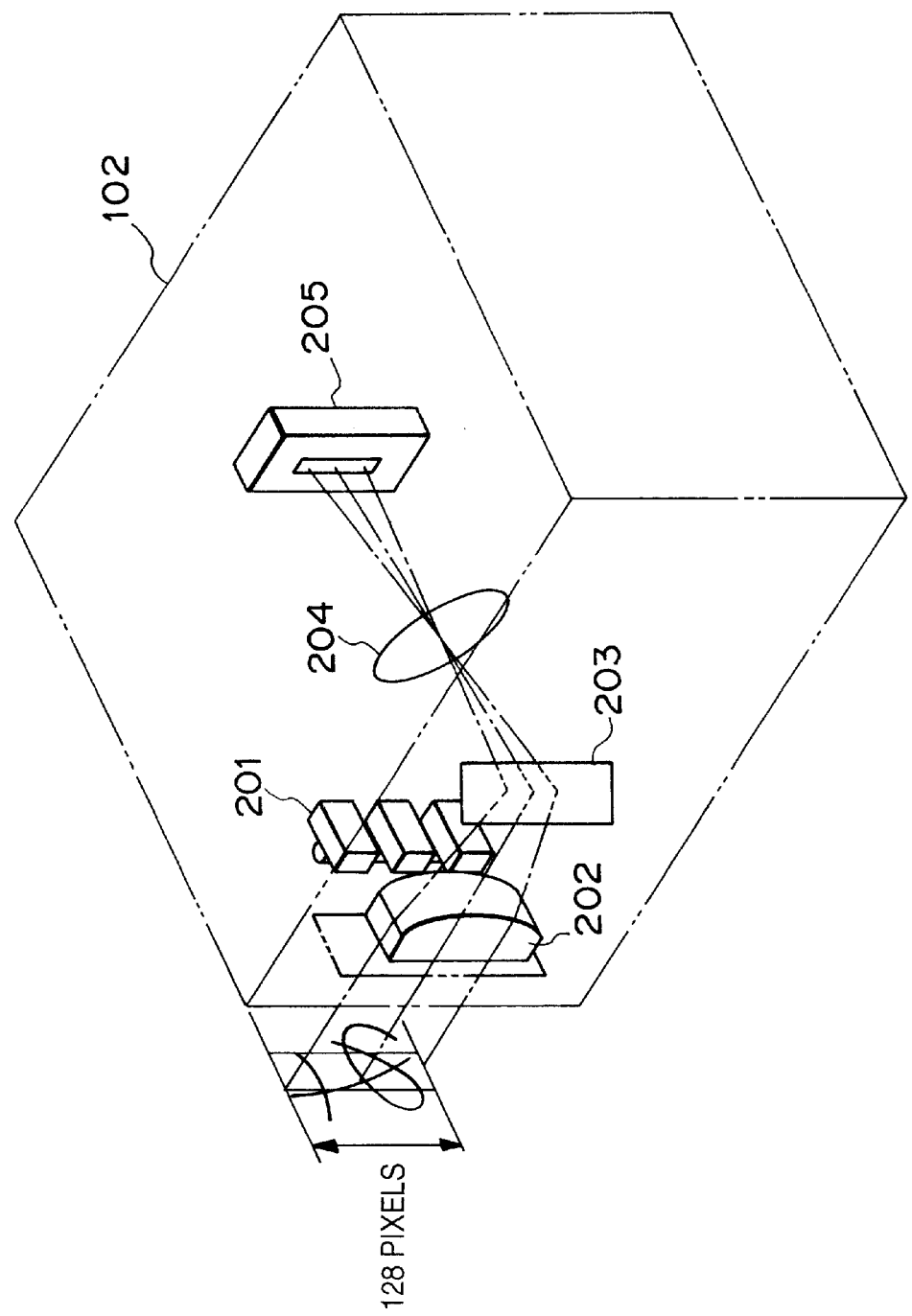
FIG. 2 is a perspective view showing the construction of an image reading (scanner) unit 102.

FIG. 2 is a perspective view showing the construction of the image reading (scanner) unit 102. The image reading unit 102 reads an original image or an original sheet in place of the print sheet 111, fed by the paper-feed roller 110, performs photoelectric conversion, and outputs an electric signal.

In FIG. 2, numeral 201 denotes an LED for exposure of the original to be read; 202, a field lens; 203, a mirror; 204, a master lens; and 205, a line sensor. The reflected light from the original exposed by the LED 201 is guided to the line sensor 205 via the field lens 202, the mirror 203 and the master lens 204. The line sensor 205, having 128-pixel photoelectric converting devices (CCDs) arrayed on one line, outputs an analog image signal of a level in correspondence with the density level of the original image.

Next, the reading operation performed on the original image by the scanner unit 102 attached to the carriage 103 will be described.

The original in place of the print sheet 111 is set in a predetermined feeder or a cassette (not shown) and supplied to the apparatus. The paper-feed roller 110 feeds the original to a predetermined reading position. The carriage 103 carrying the scanner unit 102 moves from the left to the right (as the forward scan) in FIG. 1, as described in the printing operation. By this operation, the original image is read by the line sensor 205 by a reading width corresponding to 128 pixels. After the forward scan of the carriage 103, the paper-feed roller 110 rotates to feed the original by 128 pixels, and the carriage 103 moves from the right to the left (as the reverse scan) in FIG. 1, in preparation for the next image reading by the carriage scanning.

Thus, original image reading is performed by repeating the movements of the carriage 103 and the paper feeding as above plural times.

Note that in the above description, the original image reading operation is made while the carriage 103 makes the forward scan, however, it may be arranged such that the image reading is made in both the forward scan and the reverse scan of the carriage 103.

Further, the moving amount of the original by the rotation of the paper-feed roller 110 is not limited to the 128-pixel width. For example, it may be arranged such that the original image is fed by ½ of 128 pixels, i.e., 64 pixels, or ¼ of 128 pixels, i.e., 32 pixels.

Further, as described later, the scanner unit 102 has a binary reading mode to read an image as monochromatic binary information, and a multivalued reading mode to read an image as multivalued information of at least ternary representation. For example, if the image is read as 256 level multivalued information, each pixel is represented by 8 bits.

Figure 3:
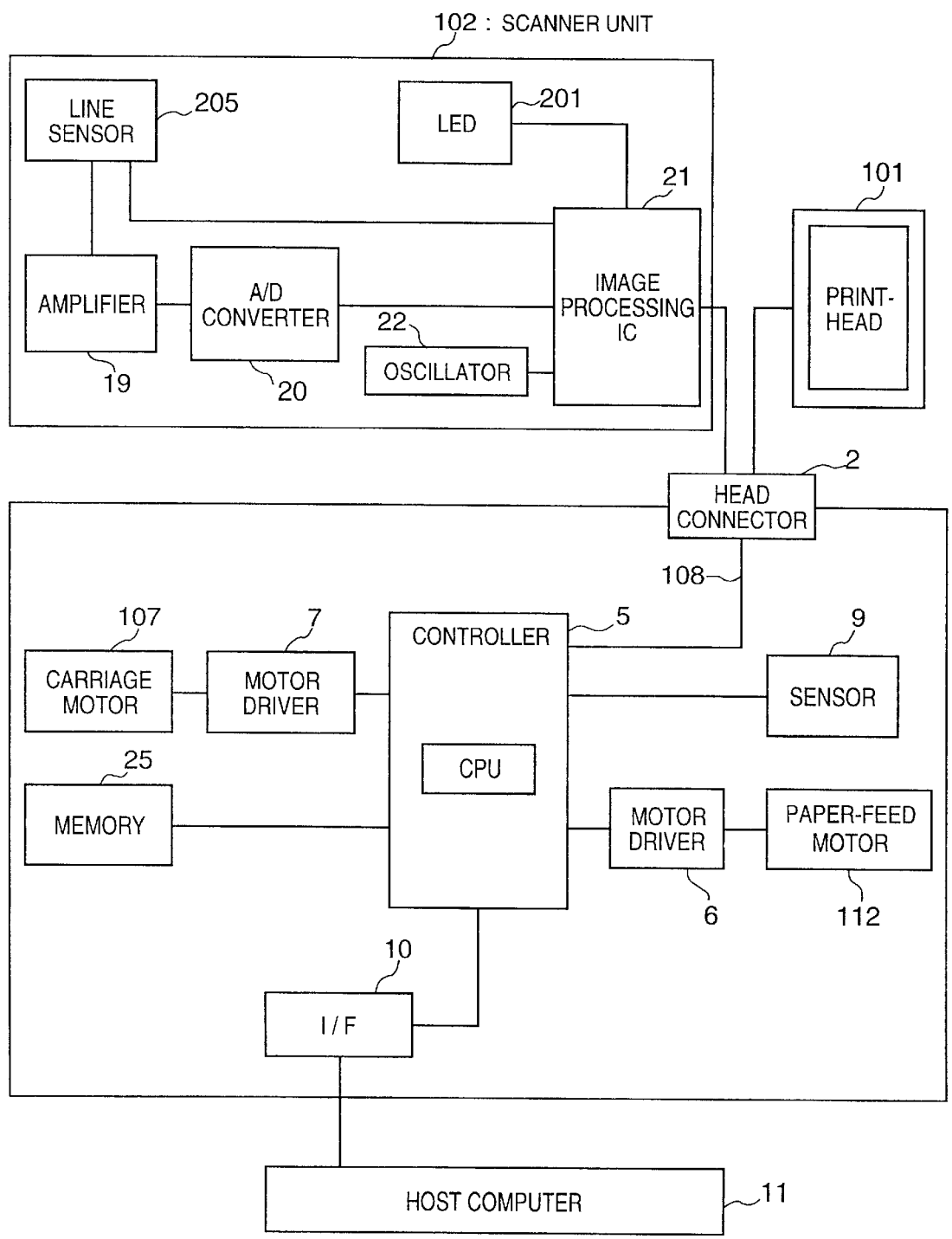
FIG. 3 is a block diagram showing the control construction of the image printing/reading apparatus.

FIG. 3 is a block diagram showing the control construction of the image printing/reading apparatus.

As described above, the printhead 101 or the scanner unit 102 is connected to a head connector 2 in accordance with the purpose of the apparatus.

First, the operation of the apparatus as a printing apparatus when the printhead 101 is connected to the head connector 2 will be described with the functions and the structures of the respective constituents.

Print data of a character, an image or the like is transferred from a host computer 11 via an interface (I/F) 10, under the control of the host computer 11 and a controller 5 having a CPU. The controller 5 converts the received print data into bit data for printing an image on the print sheet 111 by the printhead 101, and stores the bit data into a memory 25. Then, the controller 5 transfers the bit data from the memory 25 to the printhead 101 via the FPC 108 and the head connector 2, and prints the character, image or the like on the print sheet 111 as a dot pattern.

Note that the controller 5 controls the rotation of the paper-feed motor 112 via the motor driver 6 to feed the print sheet 111. Further, the controller 5 drives the carriage motor 107 via the motor driver 7, to move the carriage 103.

Further, a sensor 9 detects whether or not the print sheet 111 or the original is set in the predetermined feeder or cassette (not shown), and whether or not the carriage 103 is located at its start position.

Note that the host computer 11 transfers various parameters related to image printing and reading, as well as the above-described character data and image data, to the interface (I/F) 10, and the controller 5 controls various operations for image printing and reading in accordance with these parameters.

Next, the operation of the apparatus as an image reading apparatus when the scanner unit 102 is connected to the head connector 2 will be described with the functions and the structures of the respective constituents.

When the apparatus operates as an image reading apparatus, the scanner unit 102 operates similarly to the printhead 101 as described in the printing operation, to scan the original. The LED 201 included in the scanner unit 102 emits light on the original, and the line sensor 205 having a photoelectric conversion characteristic detects reflection light in correspondence with the printed character or image. An amplifier 19 amplifies a signal outputted from the line sensor 205 to a level appropriate to the subsequent processing, and an A/D converter 20 converts the signal into digital data. Then, an image processing IC 21 performs correction and image processing such as shading correction and binarization processing on the digital data, and transfers the processed data as image data to the controller 5 via the head connector 2.

The image data is transferred to the host computer 11 in accordance with a flow reverse to the flow of the print data in the above-described printing operation. That is, the image data sent from the image processing IC 21 is stored into the memory 25 via the head connector 2, the FPC 108 and the controller 5. Next, the controller 5 transmits the image data via the interface 10 to the host computer 11, in synchronized transfer timing. At this time, the controller 5 converts the image data received from the image processing IC 21 into data of a format appropriate to the transmission processing by the interface 10 or a format appropriate to processing by the host computer 11, and transmits the data.

Note that the image processing IC 21 has an oscillator 22 to generate a clock signal for timing data transfer to the controller 5 or the like.

Next, an image printing period and an image reading period will be described.

Figure 4:
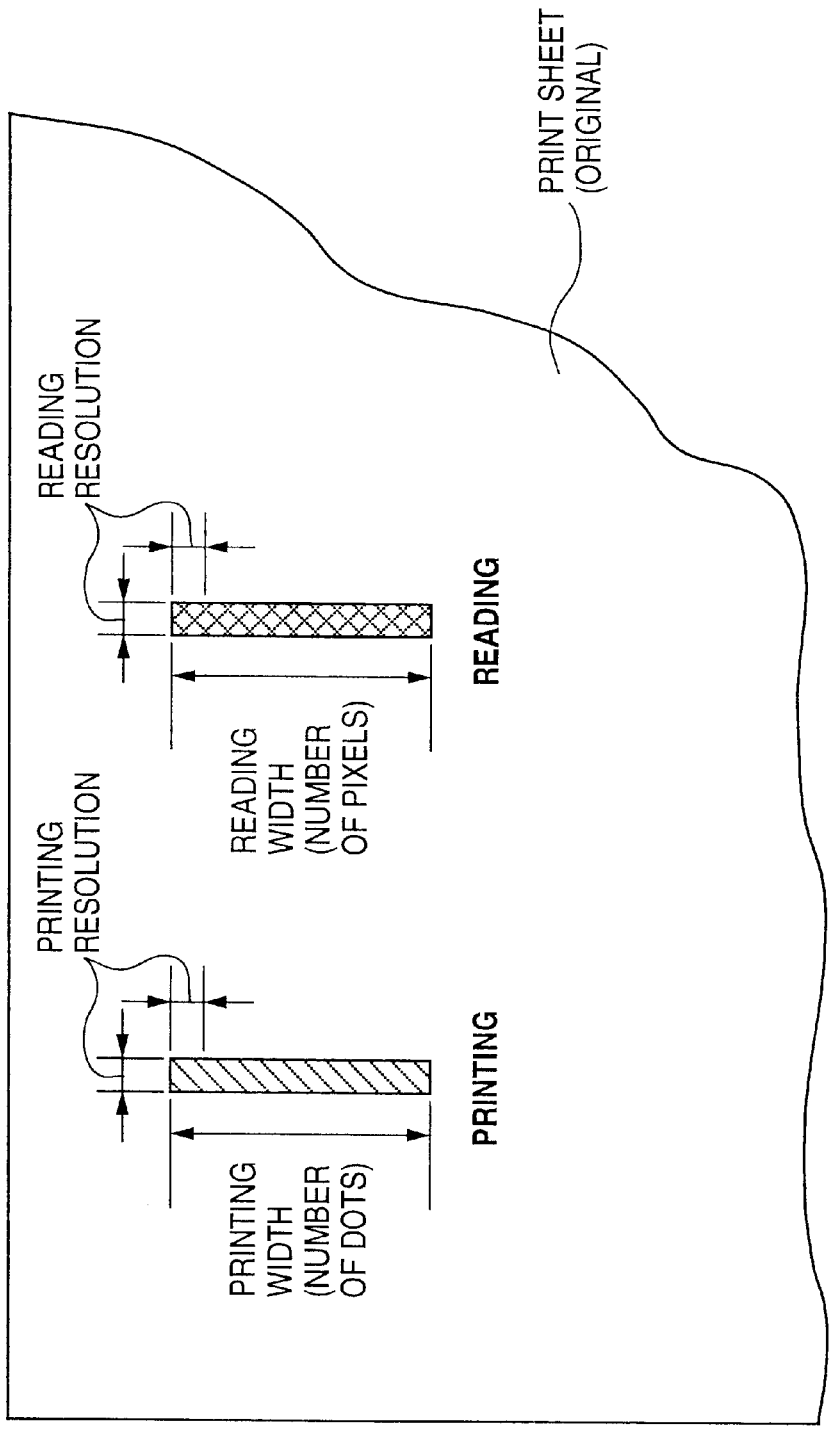
FIG. 4 is an explanatory view showing the size of one dot printed on a print sheet and the size of one read dot.

FIG. 4 is an explanatory view showing the size of one dot printed on a print sheet and the size of one read dot.

As shown in FIG. 4, the printing period in the printing operation is determined by the speed of printing with respect to a printing medium, the printing resolution, the number of ink discharge orifices of the printhead 101 (the number of print dots), the printing width of the printhead 101 and the like.

Accordingly, the image reading period can be the same as the printing period if the number of reading pixels of the line sensor 205 in the scanner unit 102 is the same as the number of the printing dots of the printhead 101, and the reading width is the same as the value of the printing width, further, if the reading resolution is the same as the printing resolution. Note that the methods and values, used in the printing operation, as the controls of the carriage motor 107 and the paper-feed motor 112 and the various control parameters, can be used in the image reading operation.

Figure 5:
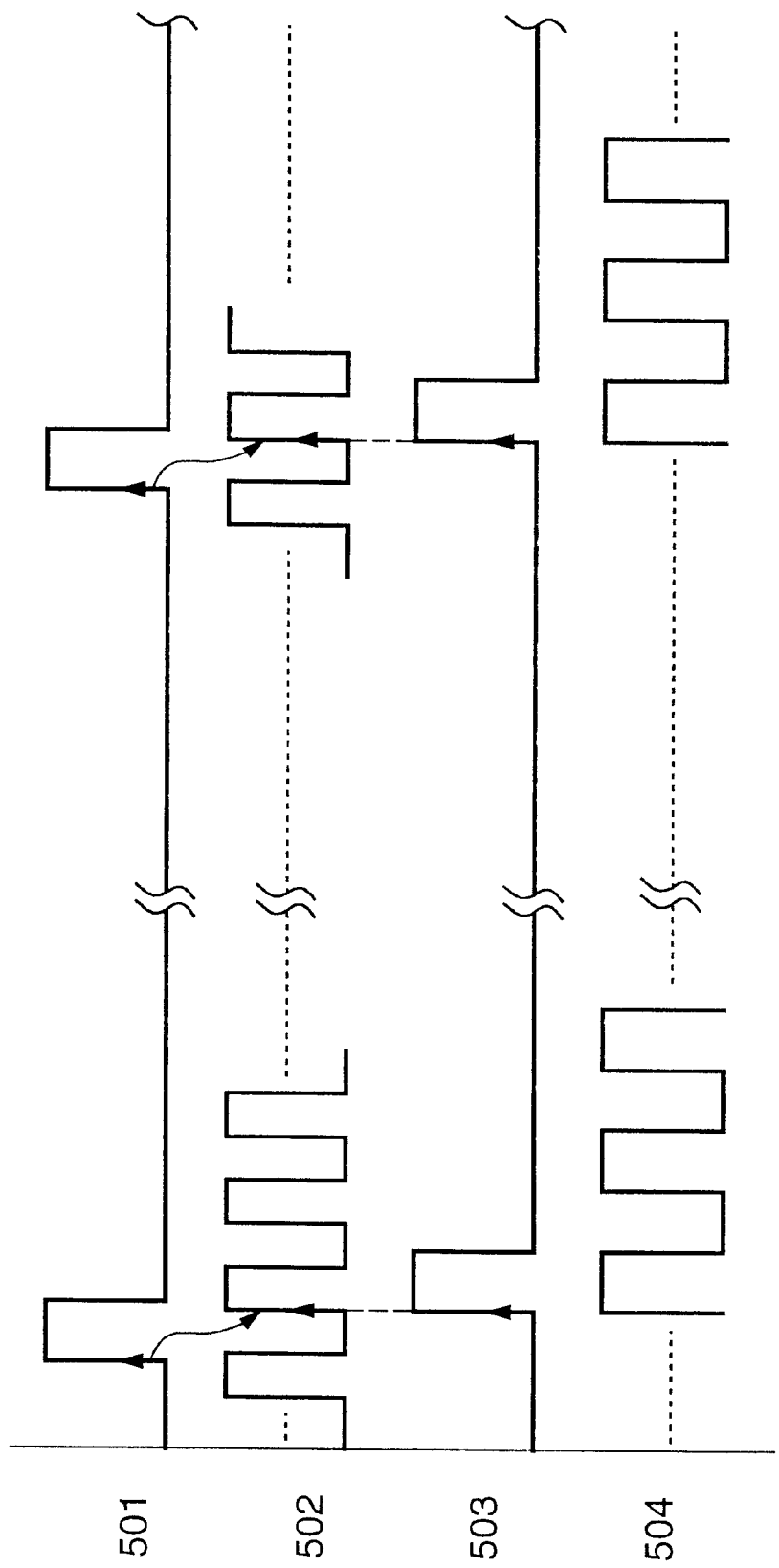
FIG. 5 is a timing chart showing various signals used for controlling the printing operation and the reading operation.
Figure 6:
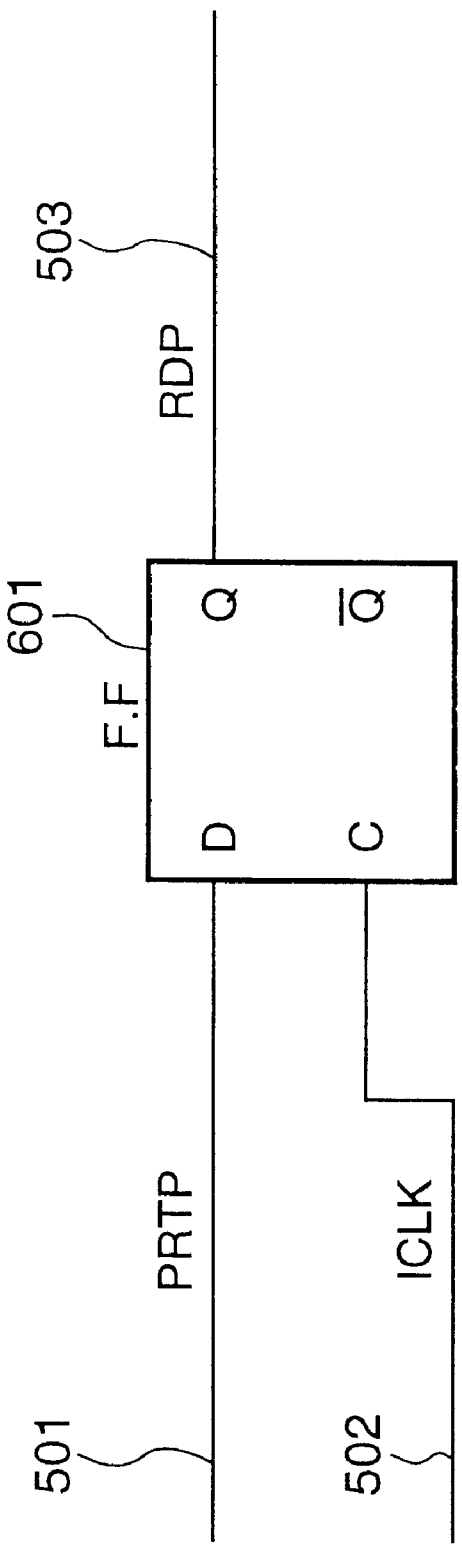
FIG. 6 is a block diagram showing the construction of a regulating circuit for a printing period signal and a reading period signal, included in an image processing IC.

FIG. 5 is a timing chart showing various signals used for controlling the printing operation and reading operation. FIG. 6 is a block diagram showing the construction of a regulating circuit for a printing period signal and a reading period signal, included in the image processing IC 21.

In FIG. 5, a printing period signal (PRTP) 501, generated by the controller 5, enters the image processing IC 21 of the scanner unit 102 via the head connector 2. The signal 501 enters a terminal D of a flip-flop 601 included in the image processing IC 21 as shown in FIG. 6. On the other hand, an internal clock (ICLK) 502 generated by the oscillator 22 enters a terminal C of the flip-flop 601. This internal clock is synchronized with a sensor clock (SCLK) 504 as a reference clock of the image reading operation. The flip-flop 601 outputs the printing period signal (PRTP) 501 as a reading period signal (RDP) 503, in synchronization with the internal clock (ICLK) 502, from its terminal Q.

As a result, the image processing IC 21 outputs the reading period signal (RDP) 503 to the line sensor 205. Accordingly, the image reading operation is performed in the period the same as that used in the printing operation.

When a multivalued image is read from an original image, the tone level is discriminated based on the intensity of reflection light from the image. Accordingly, the reflection light must have a sufficiently wide dynamic range. This means that the amount of light inputted into the line sensor 205 must be sufficiently large.

In the apparatus of the present embodiment, the reading resolution is lowered such that a sufficient amount of light can be obtained by increasing the area per one reading pixel. In a case where the printing resolution and the reading resolution of the apparatus are 400 dpi, the reading resolution is lowered to 200 dpi when reading a multivalued image. That is, in the pulse of the reading period signal (RDP) 503, 1 pulse is thinned at every 2 pulses, and the thinned pulse is used as the reading period signal.

Figure 7:
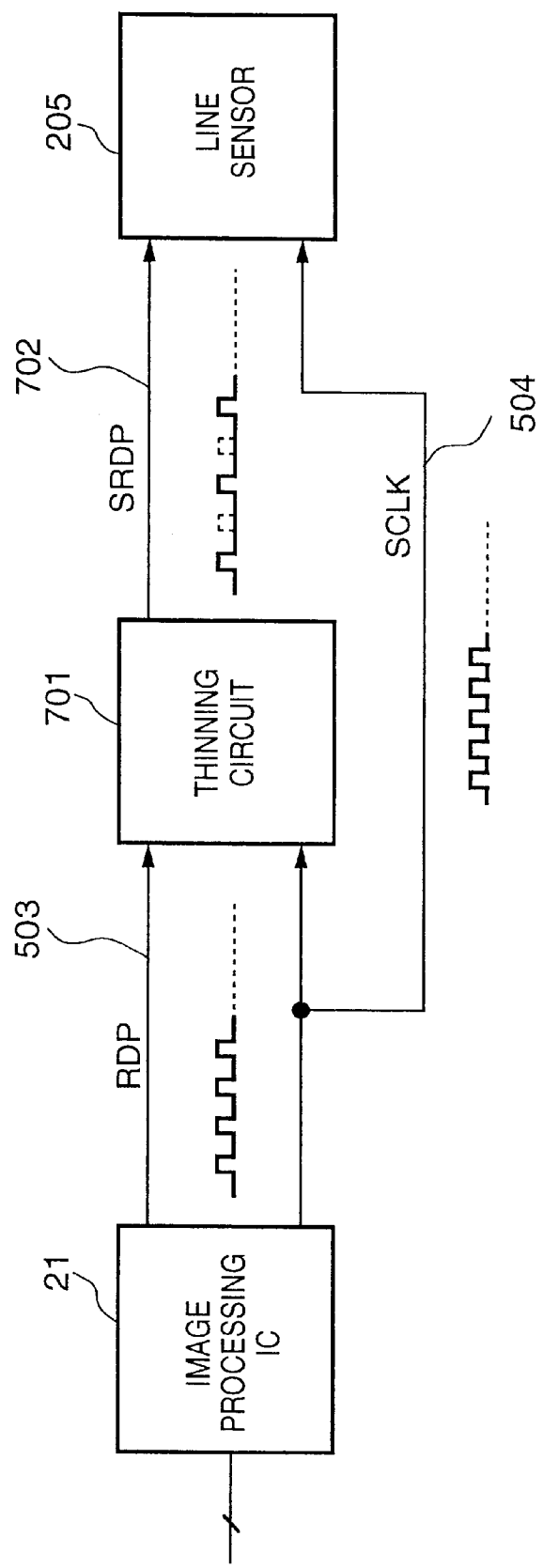
FIG. 7 is a block diagram showing the construction of a regulating circuit for the reading period signal when reading a tonality-oriented multivalued image.

More specifically, in the circuit construction as shown in FIG. 7, a thinning circuit 701 to double the period of the reading period signal (RDP) 503 is provided between the image processing IC 21 and the line sensor 205. Then a thinned reading period signal (SRDP) 702 is output to the line sensor 205. This doubles the amount of reception light at the line sensor 205, and as a result, doubles the level of the electric signal obtained as the output from the line sensor 205. Note that the frequency of generated pulses is reduced to half of that of the reading period signal (RDP) 503 by doubling the period of the reading period signal (RDP) 503.

Especially, this control is effective, not in reading an image, represented by a relatively smaller number of tone-levels, where 1 pixel is represented with 4 or 8 levels, but in reading an image, represented by a relatively greater number of tone-levels, where 1 pixel is represented with 64 levels or 256 levels.

Figure 8:
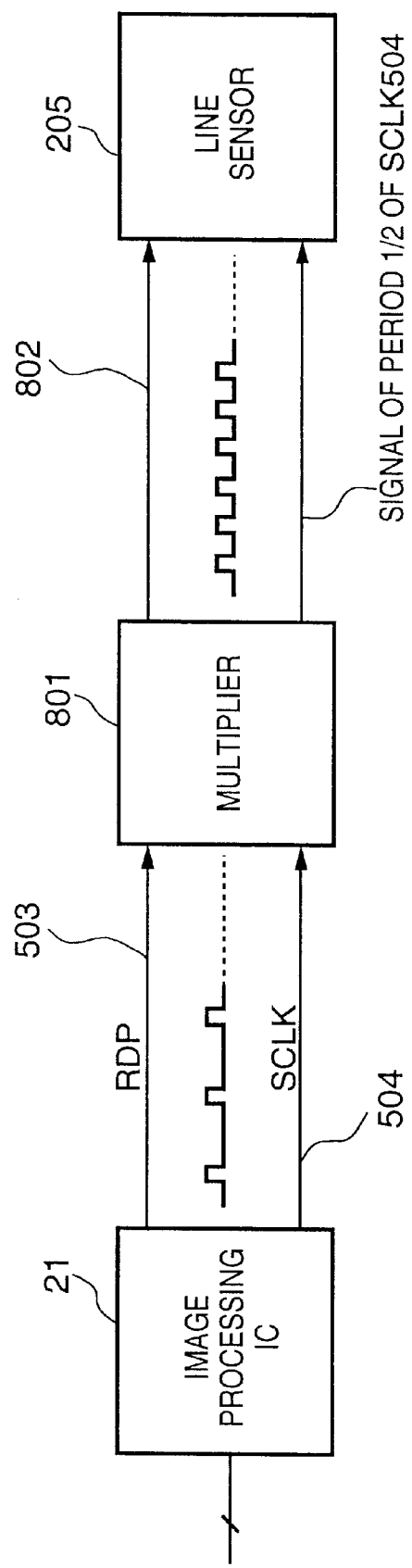
FIG. 8 is a block diagram showing the construction of a regulating circuit for the reading period signal when reading a resolution-oriented image.

Note that the above example is described as a "tonality-oriented" image reading operation, however, in the case of a "resolution-oriented" image reading operation, the thinning circuit 701 in FIG. 7 is replaced by a multiplier 801 as shown in FIG. 8. In FIG. 8, the multiplier 801 generates a short period signal 802 having a period ½ of that of the reading period signal (RDP) 503. Further, the multiplier 801 generates a sensor clock having a period ½ of that of the sensor clock (SCLK) 504. The multiplier 801 outputs these signals to the line sensor 205 for the reading operation. Note that the frequency of generated pulses becomes double by reducing the periods of the reading period signal (RDP) 503 and the sensor clock (SCLK) 504 to half of these.

This enables high-resolution image reading.

Accordingly, in the present embodiment as described above, in image reading operation, the reading resolution and the reading width of the line sensor are the same as the printing resolution and the printing width, and the reading period signal is generated based on the printing period signal used as a printing signal in a printing operation. Accordingly, image printing and image reading can be performed with a simple construction and control without performing complicated control.

Further, even though all the reading width, the number of reading pixels and the reading resolution are not the same as the printing width, the number of printing dots and the printing resolution, the differences between the values can be adjusted by adding a simple thinning circuit or a multiplier if the various values in the reading operation are integral multiples of the various values in the printing operation or these values are part of an integer.

In printing apparatuses, some apparatuses have a printing resolution of 360 or 180 dpi as their reference resolution. On the other hand, the reading resolution of flat bed scanners or the like is usually 300 or 200 dpi, since the resolution of 300 or 200 dpi is required for processing by image-processing and character-recognition application software programs.

As the reading resolution of the above scanner as the image reading apparatus is not an integral multiple of the printing resolution of the above printing apparatus nor the printing resolution part of an integer, the reading and printing cannot be adjusted by merely generating a reading period signal having a period which is an integral multiple of a printing period signal or the printing period signal part of an integer as described above.

Accordingly, as a modification to the above embodiment, adjustment can be made by constructing a circuit as follows.

Figure 9:
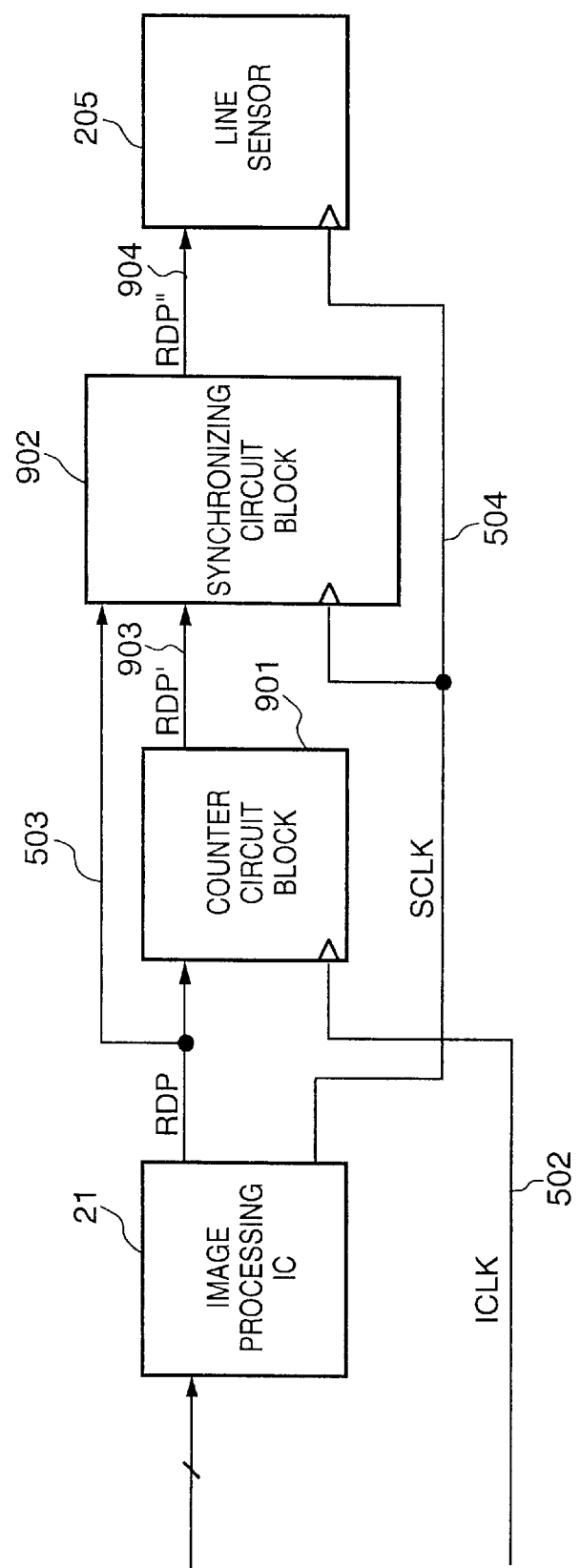
FIG. 9 is a block diagram showing a part of the circuit construction of the scanner unit 102 according to a modification of the embodiment.

FIG. 9 is a block diagram showing a part of the circuit construction of the scanner unit 102 according to the modification of the embodiment. FIG. 9 especially shows the construction between the line sensor 205 and the image processing IC 21.

As shown in FIG. 9, this modification provides a counter circuit block 901 which counts a predetermined time period of the reading period signal (RDP) 503 based on the internal clock (ICLK) 502, and a synchronizing circuit block 902 which synchronizes the reading period signal (RDP) 503 with an output count value from the counter circuit block 901 based on the sensor clock (SCLK) 504, between the line sensor 205 and the image processing IC 21.

Hereinafter, the operation of the circuits according to the modification will be described with reference to the signal timing chart of FIG. 10, on the premise that the printing resolution of the printing apparatus is 360 dpi and the reading resolution of the scanner is 300 dpi.

As described above, the image processing IC 21 generates the reading period signal (RDP) 503 corresponding to the reading period of the 360 dpi resolution (T360 in FIG. 10), and inputs the signal into the counter circuit block 901. The counter circuit block 901 counts the signal width of the input signal based on the internal clock (ICLK) 502, and generates a pulse corresponding to the reading period of the 300 dpi resolution (T300 in FIG. 10), thus generating a reading period signal (RDP') 903. Then, the counter circuit block 901 outputs the reading period signal (RDP') 903 into the synchronizing circuit block 902.

Figure 10:
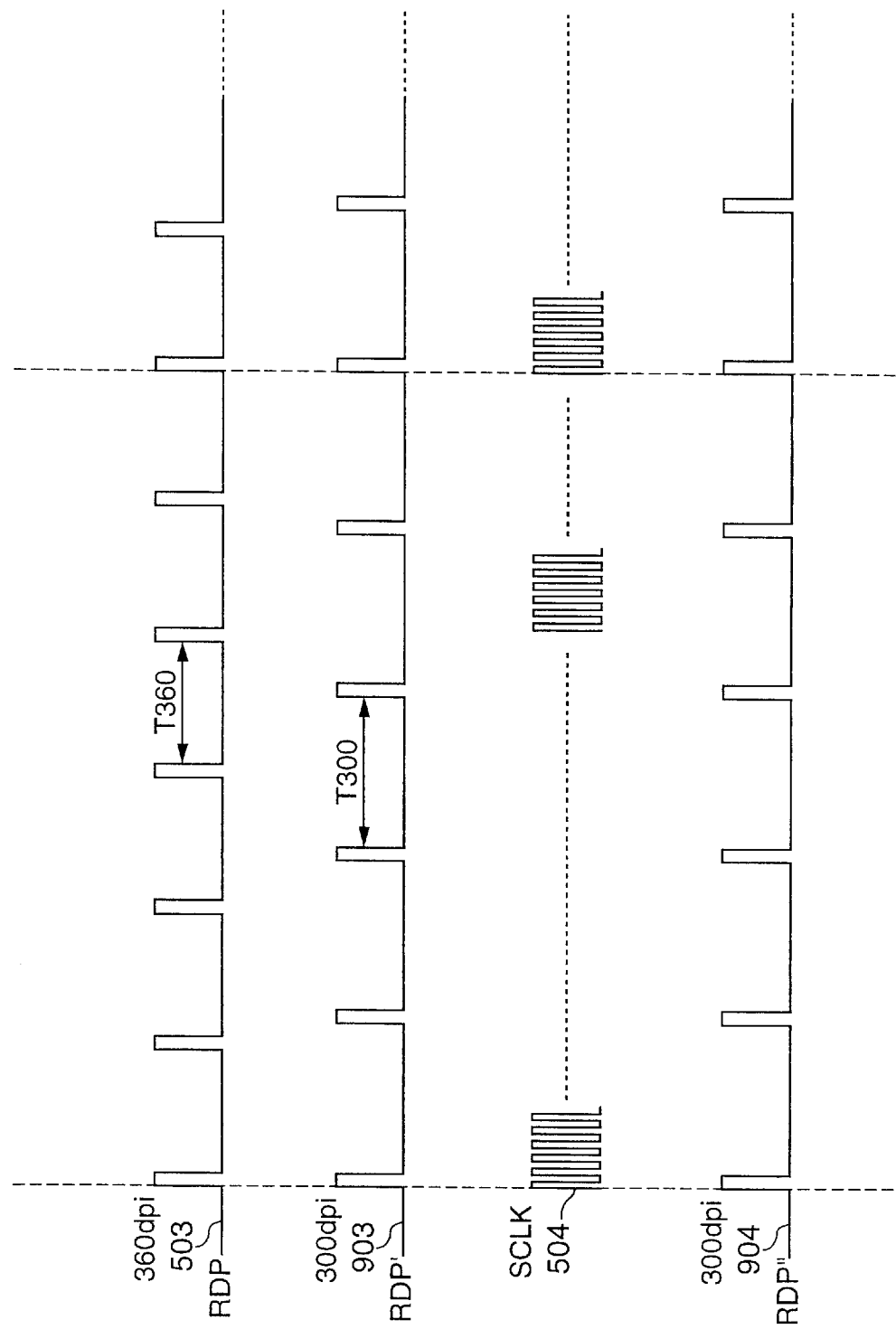
FIG. 10 is a timing chart showing signals related to a counter circuit block and a synchronizing circuit block according to the modification.

Next, in order to ensure higher reading precision, the synchronizing circuit block 902 receives the reading period signal (RDP) 503 and the sensor clock (SCLK) 504, and synchronizes a signal to be output as a reading period signal (RDP") 904 with the pulse of the reading period signal (RDP) 503 from the image processing IC 21 and the pulse of the sensor clock (SCLK) 504, as represented with a broken line in FIG. 10.

The relation between the period (T360) of the reading period signal (RDP) 503 of 360 dpi resolution and the period (T300) of the reading period signal (RDP') 903 of 300 dpi resolution is T360:T300=5:6. Accordingly, the pulse of the reading period signal (RDP) 503 of 360 dpi resolution is synchronized, once per 5 pulses of the reading period signal (RDP") 904 of 300 dpi resolution output from the synchronizing circuit block 902.

Accordingly, in the modification as described above, even if the reading resolution of the image reading apparatus is not an integral multiple of the printing resolution of the printing apparatus nor the printing resolution part of an integer, the reading period signal can be generated from the printing period signal by providing the counter circuit block to count the predetermined time period of the reading period signal (RDP) and the synchronizing circuit block to synchronize the reading period signal (RDP) 503 with the reading period signal (RDP") 904, between the image processing IC 21 and the line sensor 205.

Note that, in the above-described embodiment, an example where a circuit for generating a reading period signal is provided in the scanner unit 102 as shown in FIG. 3 is described. However, this invention is not limited to this embodiment. For example, this invention is also applicable to a case where the same circuit is integrated in the image printing/reading apparatus, and if a scanner unit is mounted on a carriage, a reading period signal is generated based on a printing period signal. Accordingly, the construction of the scanner unit can be simplified by integrating the circuit for generating the reading period signal in the image printing/reading apparatus.

Also, as described above, according to the construction in which a circuit for generating a reading period signal is provided in the scanner unit 102, regardless of the type of unit mounted on a carriage, the image printing/reading apparatus merely outputs a printing period signal to the mounted unit via the carriage. This enables the apparatus to perform an image printing operation and an image reading operation without complicating the control of the apparatus.

Furthermore, in the above-described embodiment, an apparatus designed for mainly printing an image, that is, a printing apparatus to which an image reading function is added, is exemplified. However, this invention is not limited to this construction. For example, this invention is applicable to an apparatus designed for mainly reading an image, that is, an image reading apparatus to which an image printing function is added. In this case, it may be arranged that an apparatus first generates a reading period signal for an image reading, and further generates a print period signal based on the reading period signal only if an image printing is to be performed using a printhead.

The embodiment described above has exemplified a printer, which includes means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or continuous type. Particularly, in the case of the on-demand type, the system is effective because, by applying at least one driving signal, which corresponds to printing information and gives a rapid temperature rise exceeding film boiling, to each of the electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

IS As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit, or a cartridge type printhead in which an ink tank is integrally arranged on the printhead itself, can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid.

Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile). Furthermore, the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image input/output apparatus, including a carriage to which either a printhead for printing an image on a print medium or an image reading head for reading an original image is exchangeably attached, said apparatus for performing image output or original image reading by scanning the carriage according to a type of head attached to the carriage, said apparatus comprising:
    a scanning unit that scans said carriage;
    print period generation means for generating a printing period control signal corresponding to a period of driving said printhead; and
    reading period generation means for generating a reading period control signal corresponding to a period of a reading operation by said image reading head, the reading period control signal being based on a period of the printing period control signal,
    wherein when reading the original image with said image reading head being attached to the carriage, the reading operation is performed based on the reading period control signal generated by said reading period generation means, and
    wherein when printing the image with said printhead being attached to the carriage, the image printing by said printhead is performed based on the printing period control signal generated by said print period generation means.

2. The apparatus according to claim 1, wherein
said printhead includes a plurality of printing elements,
said image reading head includes a plurality of reading elements, and
a printing width corresponding to the plurality of printing elements of said printhead and a reading width corresponding to the plurality of reading elements of said image reading head are the same.

3. The apparatus according to claim 2, wherein a printing resolution by the plurality of printing elements of said printhead and a reading resolution by the plurality of reading elements of said image reading head are the same.

4. The apparatus according to claim 2, wherein a spatial interval of the plurality of printing elements of said printhead and a spatial interval of the plurality of reading elements of said image reading head are the same.

5. The apparatus according to claim 2, wherein the number of the plurality of printing elements of said printhead and the number of the plurality of reading elements of said image reading head are the same.

6. The apparatus according to claim 1, wherein the period of the printing period control signal and a period of the reading period control signal are the same.

7. The apparatus according to claim 1, wherein said reading period generation means generates the reading period control signal as a signal obtained by multiplying the period of the printing period control signal by an integer.

8. The apparatus according to claim 7, wherein a reading resolution of said image reading head in the reading operation is reduced to a value obtained by dividing a printing resolution of said printhead by an integer, using the reading period control signal generated by said reading period generation means.

9. The apparatus according to claim 1, wherein the reading period control signal is a clock pulse signal having a predetermined frequency, and
    wherein said reading period control means generates another clock pulse signal whose frequency is a value obtained by dividing the predetermined frequency by an integer.

10. The apparatus according to claim 9, wherein a reading resolution of said image reading head in the reading operation is reduced to a value obtained by dividing a printing resolution of said printhead by the integer, using the reading period control signal generated by said reading period generation means.

11. The apparatus according to claim 1, wherein said reading period generation means generates the reading period control signal as a signal having a period obtained by dividing a period of the printing period control signal by an integer.

12. The apparatus according to claim 11, wherein a reading resolution of said image reading head in the reading operation is increased to the integral multiple of a printing resolution of said printhead, by using the reading period control signal generated by said reading period generation means.

13. The apparatus according to claim 1, wherein the printing period control signal is a clock pulse signal having a predetermined frequency, and
    wherein said reading period control means generates another clock pulse signal whose frequency is an integral multiple of the predetermined frequency.

14. The apparatus according to claim 13, wherein a reading resolution of said image reading head in the reading operation is increased to the integral multiple of a printing resolution of said printhead, by using the reading period control signal generated by said reading period generation means.

15. The apparatus according to claim 1, wherein said image reading head comprises:
   a light-emitting device emitting light on the original; and
   a photo-reception device receiving the light which has been emitted by said light-emitting device and reflected by the original.

16. The apparatus according to claim 15, wherein
   said light-emitting device is an LED, and
   said photo-reception device is a photoelectric transducer that generates an electric signal in accordance with received light intensity.

17. The apparatus according to claim 1, wherein
   said printhead comprises a plurality of printing elements,
   said image reading head comprises a plurality of reading elements,
   a printing resolution by the plurality of printing elements of said printhead and a reading resolution by the plurality of reading elements of said image reading head are different from each other, and
   the printing resolution is neither an integral multiple of the reading resolution nor a value obtained by dividing the reading resolution by an integer.

18. The apparatus according to claim 17, wherein a spatial interval of the plurality of printing elements of said printhead and a spatial interval of the plurality of reading elements of said image reading head are different from each other.

19. The apparatus according to claim 17, wherein the period of the printing period control signal is neither an integral multiple of a period of the reading period control signal nor a value obtained by dividing the period of the reading period control signal by an integer.

20. The apparatus according to claim 19, wherein the printing period control signal is a clock pulse signal having a predetermined frequency, and
   wherein said reading period control means generates another clock pulse signal whose frequency is neither the integral multiple of the predetermined frequency nor the value obtained by dividing the predetermined frequency by the integer.

21. The apparatus according to claim 19, further comprising regulation means for synchronizing a signal pulse of the reading period control signal generated by said reading period generation means with a signal pulse of the printing period control signal at predetermined intervals.

22. The apparatus according to claim 21, wherein said predetermined interval is determined based on the period of the reading period control signal generated by said reading period generation means and the period of the printing period control signal.

23. The apparatus according to claim 1, further comprising a feeding unit that feeds the print medium or the original.

24. The apparatus according to claim 1, wherein said printhead is an ink-jet printhead that performs printing by discharging ink.

25. The apparatus according to claim 24, wherein said ink-jet printhead comprises electrothermal transducers that generate thermal energy to be applied to ink to discharge the ink.

26. The apparatus according to claim 1, wherein said reading period generation means generates the reading period control signal in synchronism with the printing period control signal and a signal having a predetermined period.

27. The apparatus according to claim 1, wherein said reading period generation means is provided in said image reading head,
   wherein said image reading head comprises an oscillator that generates a signal having a predetermined period, and
   wherein said reading period generation means generates the reading period control signal in synchronism with the signal generated by said oscillator and the printing period control signal.

28. An image input/output processing method for an image input/output apparatus, the apparatus having a carriage to which either a printhead for printing an image on a print medium or an image reading head for reading an original image is exchangeably attached, and the apparatus performs an image output or an original image reading by scanning the carriage according to a type of the attached head, said method comprising:
   a print period generation step of generating a printing period control signal corresponding to a period of driving the printhead;
   a reading period generation step of generating a reading period control signal corresponding to a period of a reading operation by the image reading head, the reading period control signal being based on a period of the printing period control signal;
   when reading the original image with the image reading head being attached to the carriage, performing the reading operation based on the reading period control signal generated in said reading period generation step; and
   when printing the image with the printhead being attached to the carriage, performing the image printing by the printhead based on the printing period control signal generated in said print period generation step.

29. The method according to claim 28, wherein
   a period of the generated reading period control signal is the same as the period of the printing period control signal, an integral multiple of the period of the printing period control signal, or a value obtained by dividing the period of the printing period control signal by an integer.

30. The method according to claim 28, further comprising a regulation step of synchronizing a signal pulse of the reading period control signal with a signal pulse of the printing period control signal at predetermined intervals,
   wherein a period of the generated reading period control signal is different than the period of the printing period control signal, an integral multiple of the period of the printing period control signal, or a value obtained by dividing the period of the printing period control signal by an integer.

31. The method according to claim 28, wherein said printhead is an ink-jet printhead that performs printing by discharging ink.

32. The method according to claim 31, wherein said ink-jet printhead comprises electrothermal transducers that generate thermal energy to be applied to ink to discharge the ink.

33. The method according to claim 28, wherein the reading period control signal is generated in said reading period generation step in synchronism with the printing period control signal and a signal having a predetermined period.

34. The method according to claim 28, wherein the image reading head includes an oscillator that generates a signal having a predetermined period, and wherein, in said reading period generation step, the image reading head internally generates the reading period control signal in synchronism with the signal generated by the oscillator and the printing period control signal.

35. A cartridge for use in an image input/output apparatus, the input/output apparatus performing either image printing or image reading by scanning a carriage to which one cartridge of a plurality of cartridges is attached, said cartridge comprising:

a plurality of elements arranged in a predetermined resolution; and generation means for generating a driving period control signal for one operation indicating a period of driving said plurality of elements, the driving period control signal being generated based on a period of a signal corresponding to another cartridge of the plurality of cartridges which is used for another operation, and the signal of the other cartridge indicating a predetermined period generated by the apparatus.

36. The cartridge according to claim 35, wherein said plurality of elements comprise reading elements for reading an original.

37. The cartridge according to claim 35, further comprising a light-emitting device emitting light on the original, wherein said plurality of elements are photo-reception devices receiving the light emitted from said light-emitting device and reflected by the original.

38. The cartridge according to claim 37, wherein said light-emitting device is an LED, and said plurality of elements are photoelectric transducers that generate an electric signal in accordance with received light intensity.

39. The cartridge according to claim 35, wherein the signal indicating the predetermined period is applicable to another cartridge that is attachable to the carriage.

40. The cartridge according to claim 35, wherein the signal indicating the predetermined period is capable of being supplied via the carriage, in a case where said plurality of elements are reading elements for reading an original, said cartridge functions as a reading cartridge for reading the original, in a case where said plurality of elements are printing elements for printing on a print medium, said cartridge functions as a printhead, and the signal indicating the predetermined period is used for driving said printhead.

41. The cartridge according to claim 35, wherein a period of the driving period control signal generated by said generation means is the same as the predetermined period, an integral multiple of the predetermined period, or a value obtained by dividing the predetermined period by an integer.

42. The cartridge according to claim 35, further comprising regulation means for synchronizing the signal indicating the predetermined period with the driving period control signal at predetermined intervals, wherein a period of the driving period control signal is different from the predetermined period, an integral multiple of the predetermined period, or a value obtained by dividing the predetermined period by an integer.

43. The cartridge according to claim 35, further comprising an oscillator that generates a clock signal having a predetermined period, wherein said generation means generates the driving period control signal in synchronism with the clock signal generated by the oscillator and the signal generated by the apparatus.

44. A method of controlling an information processing apparatus, the apparatus comprising (a) a carriage to which either a first type cartridge having first type elements or a second type cartridge having second type elements, functionally different from the first type elements, is exchangeably attached and (b) scanning means for scanning the carriage, the apparatus performing an operation according to a type of the cartridge attached to the carriage by driving elements of the attached cartridge while scanning the carriage by the scanning means, said method comprising the steps of:

supplying, to the cartridge attached to the carriage, a first pulse signal having a period corresponding to driving of the elements in the first type cartridge;

when the first type cartridge is attached to the carriage, driving the first type elements in the first type cartridge, based on the period of the first pulse signal;

when the second type cartridge is attached to the carriage, generating a second pulse signal in synchronism with a clock signal having a predetermined period and the period of the first pulse signal, wherein the clock signal is internally generated in the second type cartridge and the second pulse signal corresponds to driving of the elements in the second type cartridge; and when the second type cartridge is attached to the carriage, driving the second type elements in the second type cartridge based on a period indicated by the second pulse signal.

* * * * *

UNITED STATES PATENT AND TRADEMARK OFFICE
CERTIFICATE OF CORRECTION

PATENT NO. : 6,353,485 B1
DATED : March 5, 2002
INVENTOR(S) : Kaneko

It is certified that error appears in the above-identified patent and that said Letters Patent is hereby corrected as shown below:

<u>Title page, Item [54], and Column 1, line 1,</u>
Title: "APPARATUS" should read -- APPARATUS, --.

At Assistant Examiner: "Lams" should read --Lamb --.

<u>Column 1,</u>
Line 21, "COD" should read -- CCD --.
Line 34, "motors," should read -- motors --.

<u>Column 4,</u>
Line 60, "make" should read -- makes --.

<u>Column 6,</u>
Line 55, "or" should read -- on --.

<u>Column 12,</u>
Line 13, "IS" should be deleted.

Signed and Sealed this

Eighteenth Day of June, 2002

Attest:

*Attesting Officer*

JAMES E. ROGAN
*Director of the United States Patent and Trademark Office*